July 5, 1955

C. F. KRAMER 2,712,359

VEHICLE ACCELERATOR

Filed Nov. 28, 1952

C. F. KRAMER
INVENTOR

BY

ATTORNEYS

United States Patent Office 2,712,359
Patented July 5, 1955

2,712,359

VEHICLE ACCELERATOR

Clarence F. Kramer, Birmingham, Mich., assignor to Ford Motor Company, Dearborn, Mich., a corporation of Delaware Application November 28, 1952, Serial No. 323,067

1 Claim. (Cl. 180—90.6)

This invention relates generally to a motor vehicle accelerator, and particularly to the accelerator linkage connecting the accelerator pedal to the carburetor.

It has been customary to provide, in motor vehicles, a push rod extending through the toeboard for actuation by a pivoted accelerator pedal, the end of the push rod on the engine side of the toeboard being connected by suitable linkage to the carburetor to control the latter. This construction requires a hole through the toeboard and floor mat with accompanying weather sealing problems. The present invention is directed to a construction eliminating the requirement for an opening in the toeboard, and instead providing a bell crank lever having one end connected to the accelerator pedal and the opposite end connected to the carburetor. The intermediate portion or shank of the bell crank lever extends laterally through an offset portion of the bulkhead between the passenger and engine compartments of the vehicle. A journal bracket is provided for rotatably supporting the intermediate portion of the bell crank lever, the bracket being secured to the bulkhead and having a flange covering the opening in the offset portion of the bulkhead through which the shank of the bell crank lever extends. Weather sealing problems are thus eliminated, and the floor mat construction and installation are simplified since the toeboard is completely free of accelerator linkage.

Other objects and advantages of this invention will be made more apparent as this description proceeds, particularly when considered in connection with the accompanying drawings, wherein.

Figures 1, 3:
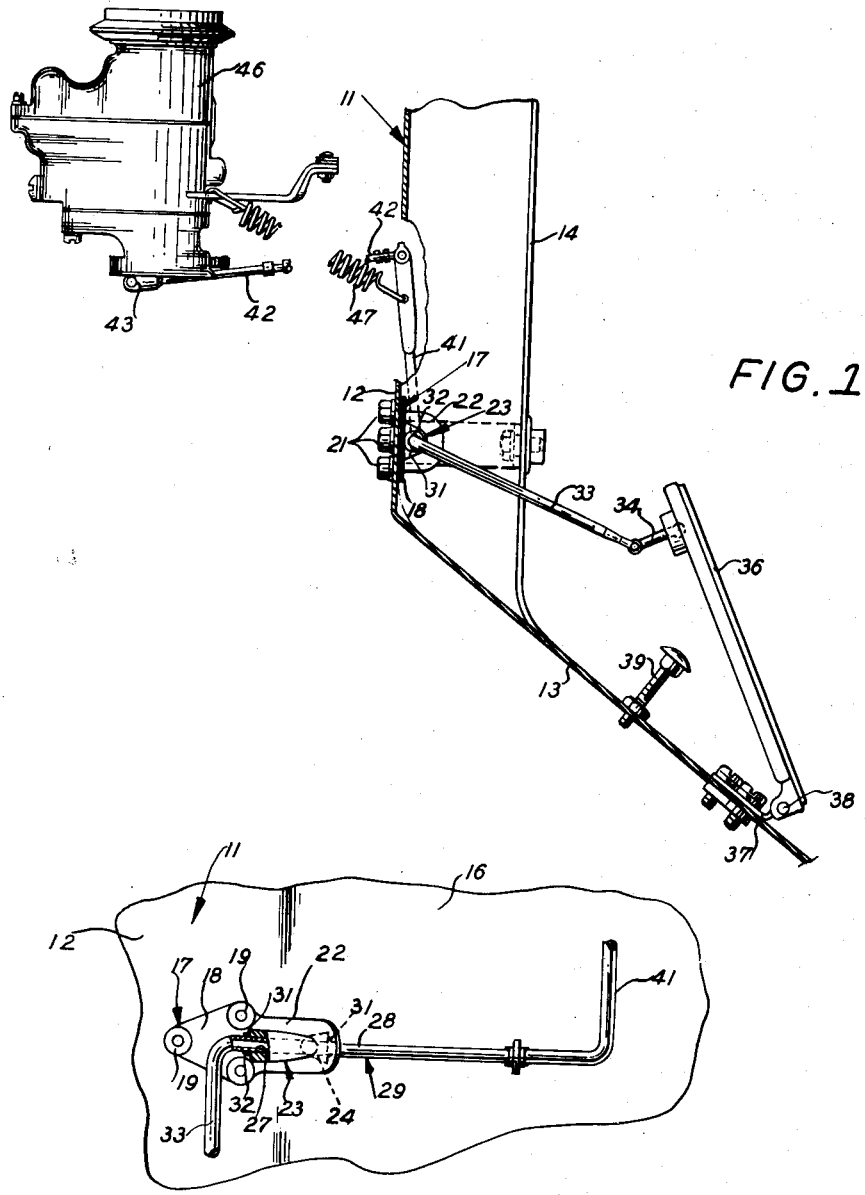
Figure 1 is a vertical longitudinal cross sectional view through the bulkhead of a motor vehicle, and showing in elevation the accelerator construction of the present invention.
Figure 3 is an elevational view partly broken away and in section, of the supporting bracket shown in Figures 1 and 2.
Figure 2:
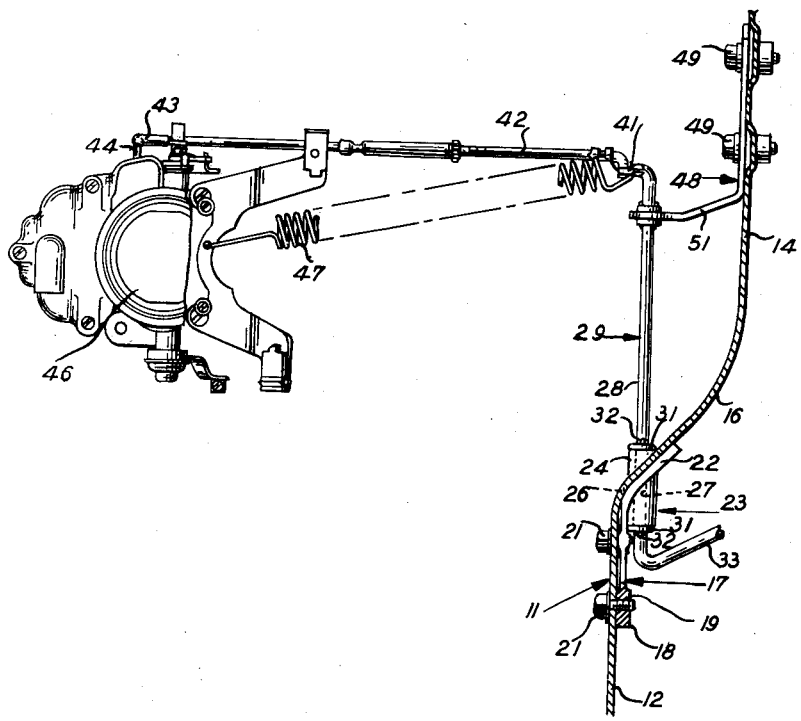
Figure 2 is a horizontal cross sectional view of the construction shown in Figure 1.

Referring now particularly to the drawings, the reference character 11 indicates the sheet metal bulkhead conventionally provided between the passenger and engine compartments of a motor vehicle. The bulkhead 11 has a generally vertical portion 12 at each side and a lower integral toeboard portion 13. In a central zone transversely of the vehicle the bulkhead 11 is provided with a rearwardly offset portion 14 joined to the side portions 12 of the bulkhead by an integral intermediate portion 16.

A supporting journal bracket 17 is mounted upon the bulkhead 11 at the junction between the left vertical side portion 12 and the inclined intermediate portion 16. The supporting bracket 17 has a base 18 provided with threaded holes 19 receiving studs 21 extending through holes in the bulkhead to clamp the bracket thereto.

An integral lateral flange 22 forms an extension of the base 18 of the supporting bracket and conforms in shape to the shape of the intermediate portion 16 of the bulkhead so as to lie in close fitting engagement with that portion of the bulkhead. The lateral flange 22 of the bracket is provided with an integral boss 23 extending generally laterally of the vehicle and on opposite sides of the flange 22. The inboard end 24 of the boss 23 extends through an opening 26 formed in the intermediate wall 16 of the bulkhead. The hole 26 is effectively covered by the flange 22 of the supporting bracket so as to provide an effective weather tight seal therefor.

The boss 23 is formed with a transversely extending bore 27 for rotatably receiving the intermediate portion or shank 28 of a bell crank lever 29. The bell crank lever is shown here as formed of tubing. The shank 28 of the bell crank lever 29 is secured against lateral displacement relative to the bracket 17 by means of a pair of retaining rings 31 encircling the shank of the bell crank lever adjacent each end of the boss 23 of the bracket. The shank of the bell crank lever is crimped as at 32 adjacent the retaining rings 31 after assembly of the lever and bracket.

As best seen in Figure 1, the rearward arm 33 of the bell crank lever 29 projects into the passenger compartment of the vehicle and in its idle position is generally parallel to the toeboard 13. The rearward end of the arm 33 is pivotally connected to a short link 34 which in turn is pivotally connected to the upper end of an accelerator pedal 36. The pedal 36 is pivotally mounted upon a bracket 37 secured to the toeboard for pivotal movement aboun a pivot pin 38. An adjustable stop 39 is mounted upon the toeboard 13 to limit the downward travel of the accelerator pedal.

The forward arm 41 of the bell crank lever 29 is of course located in the engine compartment on the opposite side of the bulkhead 11 from the rearward arm 33. The arm 41 extends generally upwardly and is pivotally connected at its upper end to a rod 42 the forward end of which is connected by means of a conventional ball connection 43 to the control member 44 of the carburetor 46. A coil spring 47 interconnects the carburetor 46 and the forward arm 41 of the bell crank lever to continually urge the latter toward its idle position.

To provide additional support for the relatively long shank 28 of the bell crank lever 29 there is provided a bracket 48 secured by bolts 49 to the central portion 14 of the bulkhead. The bracket 48 has a forwardly extending flange 51 apertured to receive and rotatably support the end of the shank 29 opposite the end which is supported by the supporting bracket 17.

It will be noted that this construction provides an overhead mounting for the accelerator linkage completely free of the toeboard portion of the vehicle bulkhead.

It will be understood that the invention is not to be limited to the exact construction shown and described, but that various changes and modifications may be made without departing from the spirit and scope of the invention, as defined in the appended claims.

What is claimed is:

In a motor vehicle having a bulkhead between the passenger and engine compartments with the bulkhead being formed with a vertical transversely extending first wall in front of the driver's position and a vertical transversely extending second wall adjacent the longitudinal centerline of the vehicle and offset rearwardly from said first wall, said first and second walls being joined by a vertical intermediate wall inclined rearwardly from said first wall to said second wall, an accelerator pedal pivotally mounted upon said vehicle rearwardly of said first vertical wall, a unitary one-piece supporting bracket mounted upon said bulkhead at the junction between said first and intermediate walls, said intermediate wall having a transversely extending opening therethrough adjacent the above mentioned junction between said first and interminate walls, said bracket having a flat mounting flange secured to said first wall and an integral covering flange extending therefrom at an angle and completely covering said opening in the intermediate wall, said bracket also having an integral enlarged transversely extending boss formed with a horizontal transversely extending bore in alignment with said opening in the intermediate wall, and a crank member having a cylindrical rod portion of substantially the same diameter as the bore in said bracket, said rod being journalled in said bore to form a weather tight force transmitting connection between the passenger and engine compartments of the vehicle, said crank member having an integral arm extending at right angles to said rod portion and connected at its rearward end to said accelerator pedal, and said rod portion having a connection to the engine controls in said engine compartment.

References Cited in the file of this patent

UNITED STATES PATENTS

| | | |
|---|---|---|
| 831,100 | Richardson | Sept. 18, 1906 |
| 1,512,829 | Drohen | Oct. 21, 1924 |
| 1,653,568 | Hicks | Dec. 20, 1927 |
| 1,883,508 | Bonday | Oct. 18, 1932 |
| 2,163,571 | Brock | June 27, 1939 |

FOREIGN PATENTS

| | | |
|---|---|---|
| 256,015 | Great Britain | Aug. 5, 1926 |